United States Patent [19]

Charon

[11] 4,368,164
[45] Jan. 11, 1983

[54] GLASS FIBER COMPOUNDING IN GASKETS AS ASBESTOS REPLACEMENT

[75] Inventor: Clarence W. Charon, Newark, Ohio

[73] Assignee: Owens-Corning Fiberglas Corporation, Toledo, Ohio

[21] Appl. No.: 316,270

[22] Filed: Oct. 29, 1981

Related U.S. Application Data

[63] Continuation of Ser. No. 192,653, Oct. 1, 1980, abandoned.

[51] Int. Cl.³ .............................................. B29H 9/02
[52] U.S. Cl. .................................. 264/37; 264/116; 264/128; 264/137
[58] Field of Search ................ 264/37, 116, 128, 136, 264/137

[56] References Cited

U.S. PATENT DOCUMENTS 3,929,956 12/1975 Jakobsen ............................ 264/137
3,947,535 3/1976 Bagg ................................... 264/137
4,058,581 11/1977 Park .............................. 264/137 X Primary Examiner—Thomas P. Pavelko
Attorney, Agent, or Firm—Ronald C. Hudgens; Philip R. Cloutier

[57] ABSTRACT

A method of dispersing glass fibers in a rubber solution comprises forming a rubber-bonded glass sheet and dissolving the rubberbond of the glass sheet in a rubber solution comprising rubber and a solvent compatible with that used to form the rubber-bonded glass sheet.

10 Claims, 1 Drawing Figure

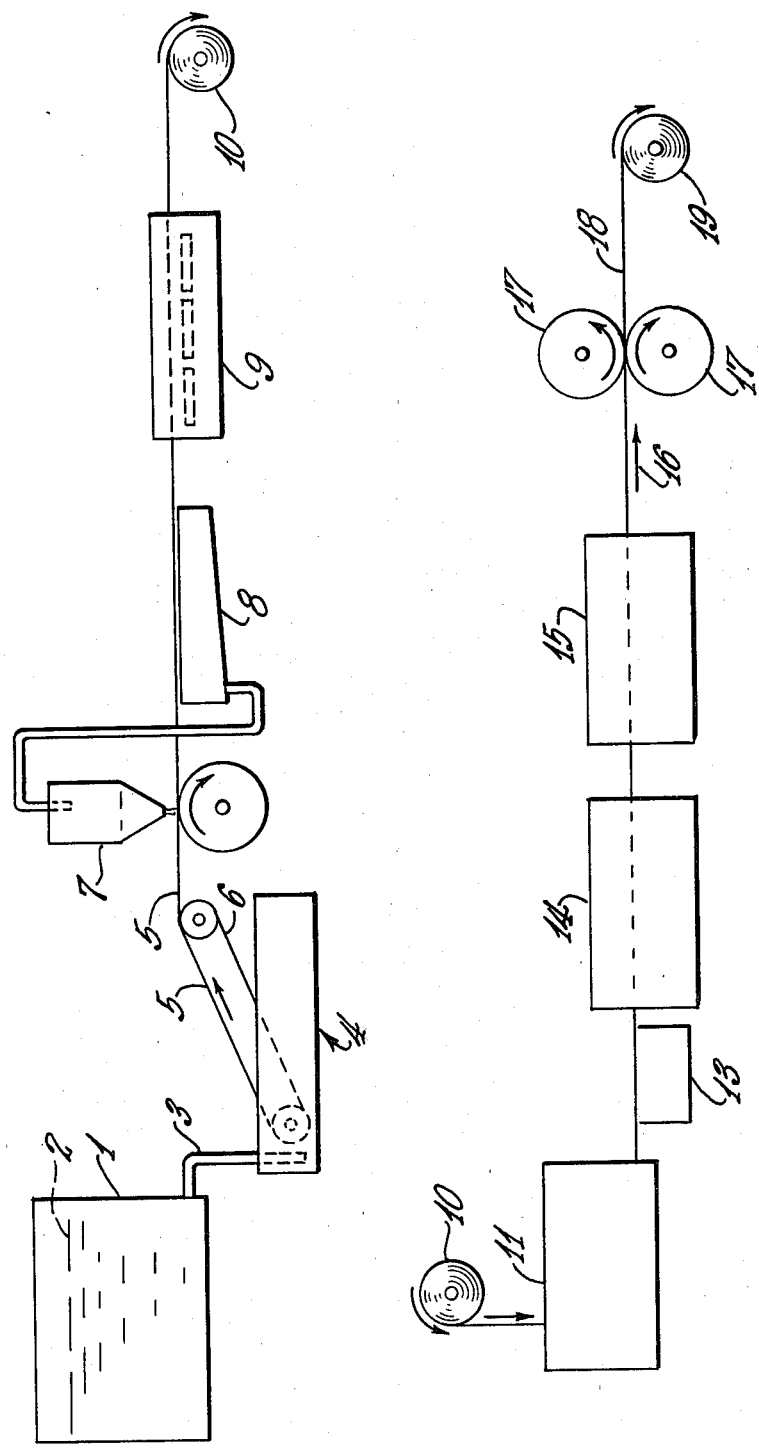

GLASS FIBER COMPOUNDING IN GASKETS AS ASBESTOS REPLACEMENT

This is a continuation of application Ser. No. 192,653, filed Oct. 1, 1980 now abandoned.

BACKGROUND OF INVENTION

This invention pertains to a method of compounding glass fibers into gaskets as asbestos replacement.

In one of its more specific aspects, this invention relates to a method of obtaining a uniform dispersion of glass fibers in an organic solvent-based composite from which rubber-based sheets, suitable for gaskets, are produced.

For years, asbestos has been used successfully in all types of gaskets. Due to its long period of use, effective methods had been developed to disperse it in the composites from which the gaskets were produced.

Recently, due to prohibitions against the use of asbestos, glass fibers have been successfully substituted for asbestos in gaskets. However, when rubber-based gaskets have been produced, some difficulty has been experienced in obtaining the desired dispersal of the glass fibers in the gasket stock.

STATEMENT OF THE INVENTION

There has now been discovered a method of compounding glass fibers in rubber-based sheets which comprises forming a rubber-bonded glass sheet, dissolving the rubberbond of the sheet in a rubber-containing solution to disperse the glass in the matrix formed, removing solvent from the matrix to form a residue and forming the residue into a sheet comprising rubber and glass.

DRAWINGS

The invention will be more easily understood if explained in conjunction with the drawing in which is illustrated the stepwise procedure which is involved in the invention.

DESCRIPTION OF THE INVENTION

This invention pertains to a method of gasket sheet production in which glass fibers, usually short and discontinuous, are incorporated into any rubber-based composition from which sheets, suitable for use as gasket material, are recovered. The usual components employed in the production of sheet gasket materials are used.

The method of this invention contemplates the use of glass fibers of any suitable dimension and length. Preferably the fibers will be DE fibers and have a length of from about ⅛ inch to about ¾ inch. The fibers can be sized with any suitable size and preferably with a size which facilitates their dispersal in water.

The sheets made by the process of this invention will be rubber-based, that is, one of the principal components of the composition will be any natural or synthetic rubber. In addition, the sheets can have included in their composition, suitable fillers and the like, all of which materials are conventionally used in gasket compositions.

Suitable rubbers include all rubbers conventionally employed in gasket production, such as natural rubber and synthetic rubbers such as homopolymers of polychlorobutadiene, polybutadiene, polyisoprene, copolymers such as styrene-butadiene, butyl rubber, nitrile rubber, ethylene-propylene copolymer, fluorine elastomers, polyacrylates, polyurethanes, silicones, polysulfides, halogen substituted rubbers and the like.

The invention involves the formation of a rubber impregnated glass mat and the dissolution of that mat in a solution in which a first rubber is dissolved in a solvent. The two rubbers need not be the same though, preferably, they will be. It is only necessary that the two rubbers be soluble in the same solvent or mixture of solvents.

Suitable solvents include, benzene, toluene, xylene, napthas, alcohols, alcohol-ethers, and other organic liquids.

Referring now to the drawing there is shown tank 1 in which a dispersion 2 of glass fibers is formed, preferably in an aqueous medium, the dispersal being facilitated by dispersing agents.

The dispersion of glass is transferred through conduit 3 into wet process machine 4 from which a sheat 5 of fibers is withdrawn from machine 4 on traveling wire screen 6.

Water is drained from the sheet on the wire screen to the extent that the sheet can then be saturated with a rubber emulsion. Simple gravitational drainage can be employed or the sheet can be heated to drive off the moisture, or a combination of both can be employed.

The substantially dry sheet is then saturated with a rubber emulsion at saturator 7 with the excess rubber emulsion being drained therefrom or drawn therefrom at evacuator 8. This saturation step deposits enough rubber on the glass to bind it together in sheet form. Generally, a rubber solution having a rubber content within the range of from about 10 to about 50 weight percent is sufficient for this purpose.

The rubberized glass sheet is then passed through heater 9 where the sheet is set. The rubberized glass sheet is then conveniently accumulated on creels 10 until used.

A partial gasket formulation, lacking the glass and some portion of the rubber required, is prepared in solvent tank 11. A typical formula will include rubber, fillers and a solvent identical to, or compatible with, that rubber used to prepare the rubber solution used to bind the glass into the sheet. The percentage of each component contributed by each source and the total composition of the mixture is as follows:

|  | Rubberized Glass Sheet, # | Rubber Solution, # | Rubber Bonded Glass Sheet Weight % |
| --- | --- | --- | --- |
| Glass | 100 | 0 | 5–10 |
| Rubber | 0.5–1.0 | 99.0–99.5 | 60–70 |
| Solvent | 0 | 100 | — |
| Filler | 0 | 100 | 20–35 |

The rubberized glass sheet is preferentially shredded into small pieces prior to introduction into the rubber solution in tank 11 wherein a uniform solution and suspension of glass therein is formed upon dissolution of the rubber holding the glass in sheet form.

After dissolution in tank 11 and the formation of a uniform mixture, excess solvent is absorbed by addition of other materials in the solution to the extent that, upon being tumbled and shaken in shaker 14, small "dough balls" are formed from the rubber-solvent-glass mixture. The solvent is absorbed in order to bring the rubber to a balling consistency.

These balls can optionally be accummulated in holding vat 15 from which they are fed onto feeder means 16, and then between rolls 17, one of which is at a temperature about 170° F. greater than the other, i.e., at temperatures of 240° F. and 70° F., respectively. These rolls are set a distance apart which is equal to the desired thickness of the finished gasket sheet and, in pressing the sheet to this thickness, act to remove the desired amount of solvent to form a relatively dry sheet 18 which can be collected as roll 19. The solvent removed by the rolling is advantageously recovered and recycled back to solvent tank 11.

It will be evident that various modifications can be made to the above process. Such, however, are considered within the scope of the invention.

I claim:

1. A method of producing a glass-fiber containing rubber-based composite which comprises:
   (a) forming a sheet of glass fibers;
   (b) saturating said sheet with a rubber emulsion to form a glass sheet held together by a rubber bond;
   (c) dissolving said rubber bond in a rubber-containing solvent to form a rubber matrix containing solvent and having said glass fibers dispersed therein; and,
   (d) removing solvent from said rubber matrix to form a glass fiber containing rubber-based composite.

2. The method of claim 1 in which said rubber emulsion has a rubber content within the range of from about 10 to about 50 weight percent.

3. The method of claim 1 in which said glass sheet held together by a rubber bond is shredded prior to contact with said rubber-containing solvent.

4. The method of claim 1 in which the solvent removed in step (d) is recycled back into the process.

5. The method of claim 1 in which said rubber emulsion comprises natural or synthetic rubber.

6. The method of claim 1 in which said rubber matrix comprises a filler.

7. The method of claim 1 in which the rubber contained in said rubber emulsion and the rubber contained in said rubber-containing solvent are selected from the group consisting of homopolymers of polychlorobutadiene, polybutadiene, polyisoprene, styrene-butadiene copolymers, butyl rubber, nitrile rubber, ethylene-propylene copolymer, fluorine elastomers, polyacrylates, polyurethanes, silicones, polysulfides and haloginated substituted rubbers.

8. The method of claim 1 in which the solvent in said rubber-containing solvent is selected from the group consisting of benzene, toluene, xylene, naphthas, alcohols and alcohol-ethers.

9. The method of claim 1 in which said sheet of glass fibers is formed in an aqueous medium.

10. The method of claim 9 in which water is removed from said sheet prior to saturating said sheet with said rubber emulsion.

* * * * *